United States Patent [19]

Lohmeyer et al.

[11] Patent Number: 4,677,964
[45] Date of Patent: Jul. 7, 1987

[54] PORTABLE GAS GRILL

[75] Inventors: Charles W. Lohmeyer, Barrington; Erich J. Schlosser, Lindenhurst; James E. Tucker, Batavia; James C. Stephen, Arlington Heights; Andrzej Leja, Palatine; John Beecher, III, Carpentersville, all of Ill.

[73] Assignee: Weber-Stephen Products Co., Palatine, Ill.

[21] Appl. No.: 759,531

[22] Filed: Jul. 26, 1985

[51] Int. Cl.$^4$ ............................................. F24C 3/04
[52] U.S. Cl. .................................... 126/41 R; 73/296; 177/234
[58] Field of Search ................ 126/39 R, 41 R, 40, 126/33, 27, 9 R, 9 B, 21 A; 73/296; 177/130, 131, 225, 231, 234; 220/94 R, 334; 99/445, 446; 431/191, 283

[56] References Cited

U.S. PATENT DOCUMENTS

| 411,576 | 9/1889 | Brown | 177/130 |
|---|---|---|---|
| 1,133,850 | 3/1915 | Garraux | 126/41 R |
| 1,224,157 | 5/1917 | Fry | 431/286 |
| 1,548,185 | 8/1925 | Carr | 126/40 |
| 1,954,476 | 4/1934 | Gloekler | 126/41 R |
| 1,964,805 | 7/1934 | Barnes | 126/9 B |
| 2,196,280 | 4/1940 | Thornhill et al. | 177/234 X |
| 2,304,140 | 12/1942 | Bergholm | 126/40 X |
| 2,447,925 | 8/1948 | Vorbusch | 126/40 |
| 2,541,528 | 2/1951 | McAvoy | 126/9 R X |
| 2,740,517 | 4/1956 | Evans | 220/94 R X |
| 2,842,044 | 7/1958 | Kirk | 126/9 R |
| 2,881,695 | 4/1959 | DiPietro | 99/446 |
| 3,418,921 | 12/1968 | Fautz | 99/446 X |
| 3,474,724 | 10/1969 | Jenn | 126/41 R X |
| 3,545,908 | 12/1970 | Lohman | 431/286 |
| 3,567,065 | 3/1971 | Dinse | 126/25 R |
| 3,859,978 | 1/1975 | Smith | 126/25 A |
| 4,233,890 | 11/1980 | Jansen | 126/25 R X |
| 4,245,505 | 1/1981 | Baynes | 126/41 R X |
| 4,321,857 | 3/1982 | Best | 126/41 R X |
| 4,413,515 | 11/1983 | Quinn | 126/41 R X |
| 4,485,972 | 12/1984 | Freber | 126/39 R X |

FOREIGN PATENT DOCUMENTS

| 832111 | 9/1938 | France | 126/41 R |
|---|---|---|---|
| 38189 | 5/1936 | Netherlands | 126/41 R |
| 143701 | 6/1920 | United Kingdom | 126/41 R |

Primary Examiner—Carroll B. Dority, Jr.
Attorney, Agent, or Firm—Robert E. Wagner; Ralph R. Rath

[57] ABSTRACT

A gas grill includes a cart and a cooking vessel supported on the cart with the cooking vessel having a lower gas burner assembly, an intermediate sear grid assembly and an upper cooking grid. The sear grid assembly includes inverted V-shaped sear bars that cause evaporation of greases from the food on the cooking grid. The cooking vessel has a lower removable grease pit for any unvaporized grease and a separate burner unit is supported on the cart. The cart also has a fuel indicator device for supporting a portable tank. The burner assembly is constructed to be assembled without the use of any tools.

30 Claims, 15 Drawing Figures

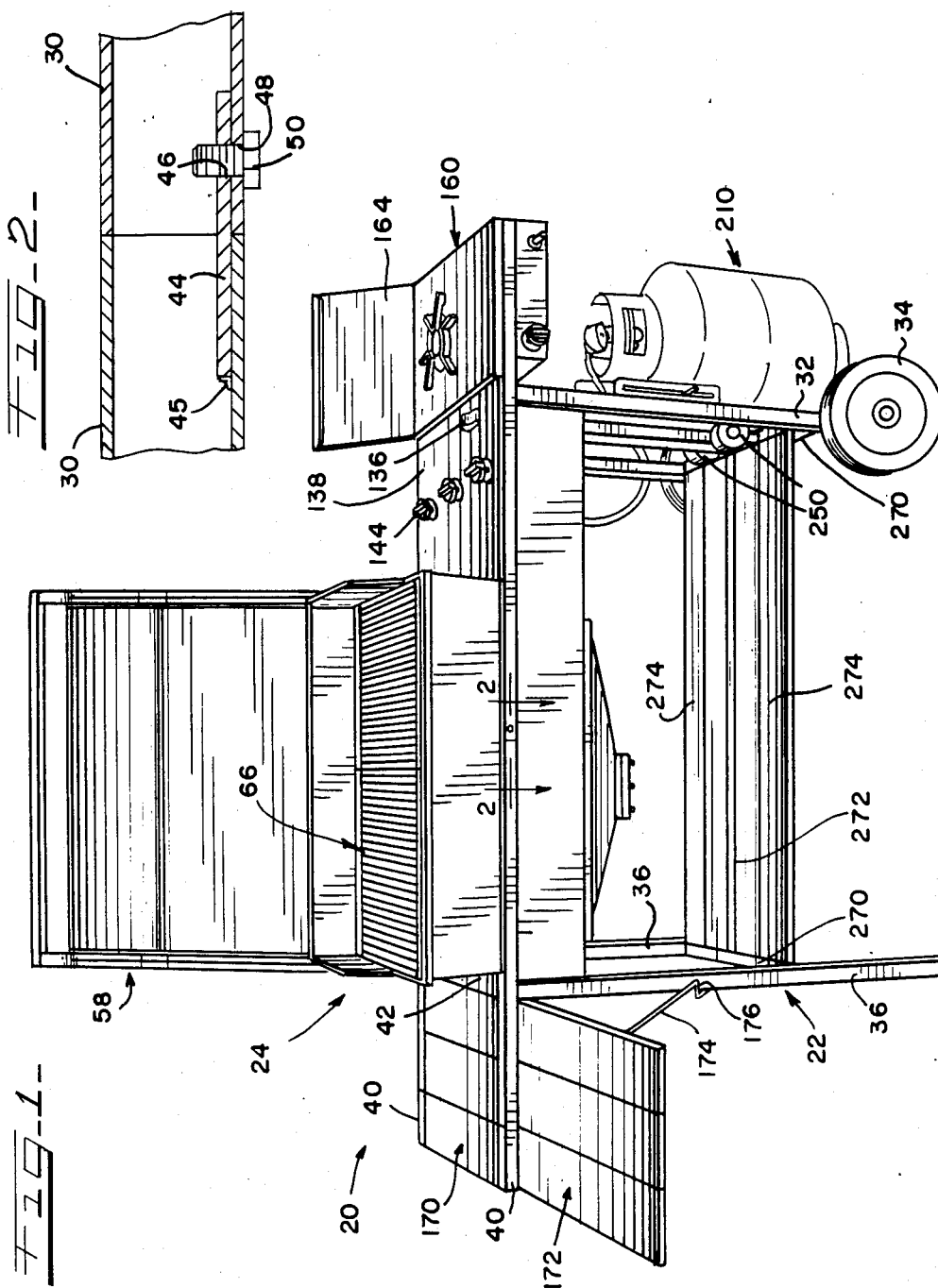

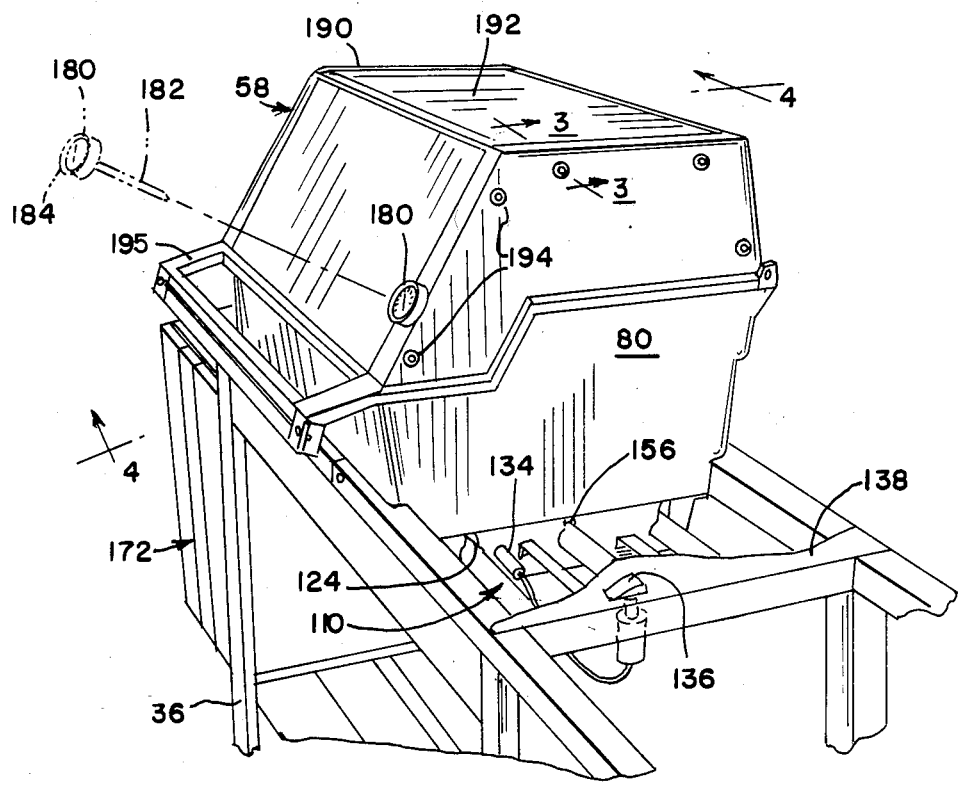
FIG_3_
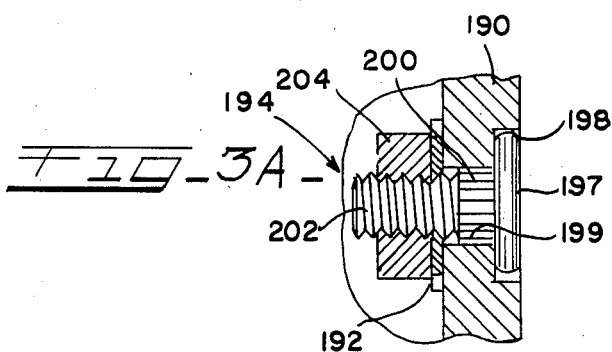
FIG_3A_

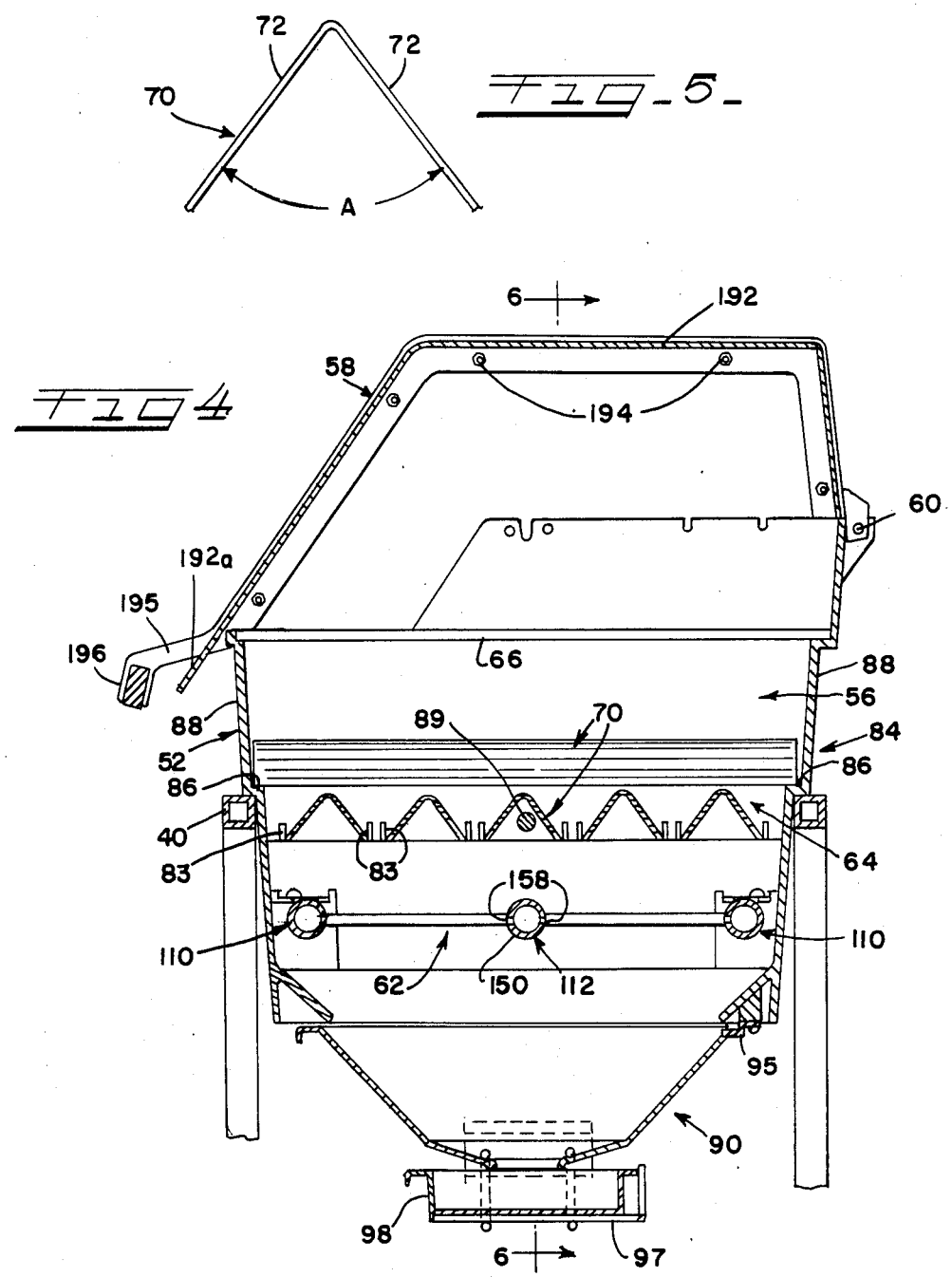

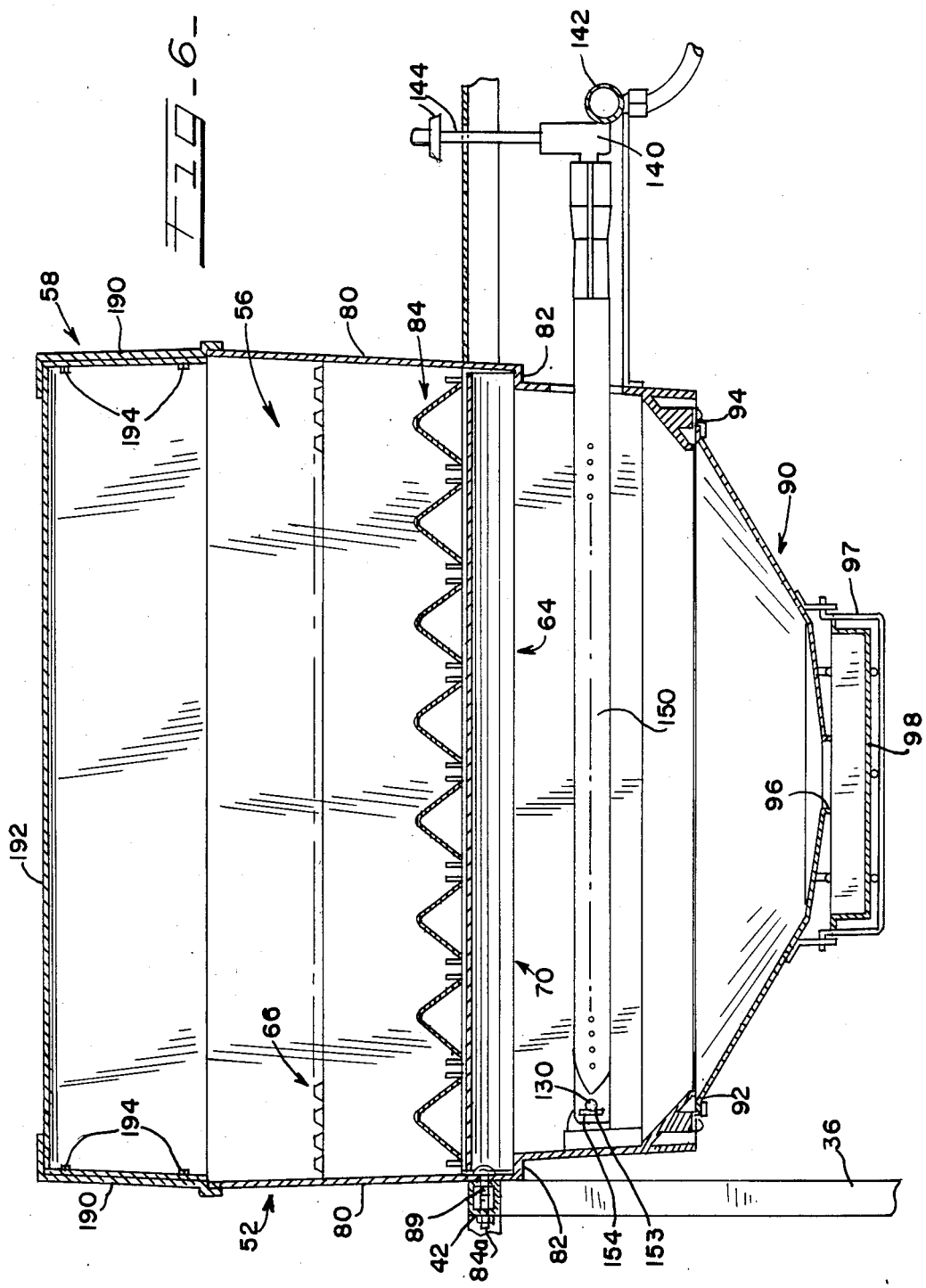

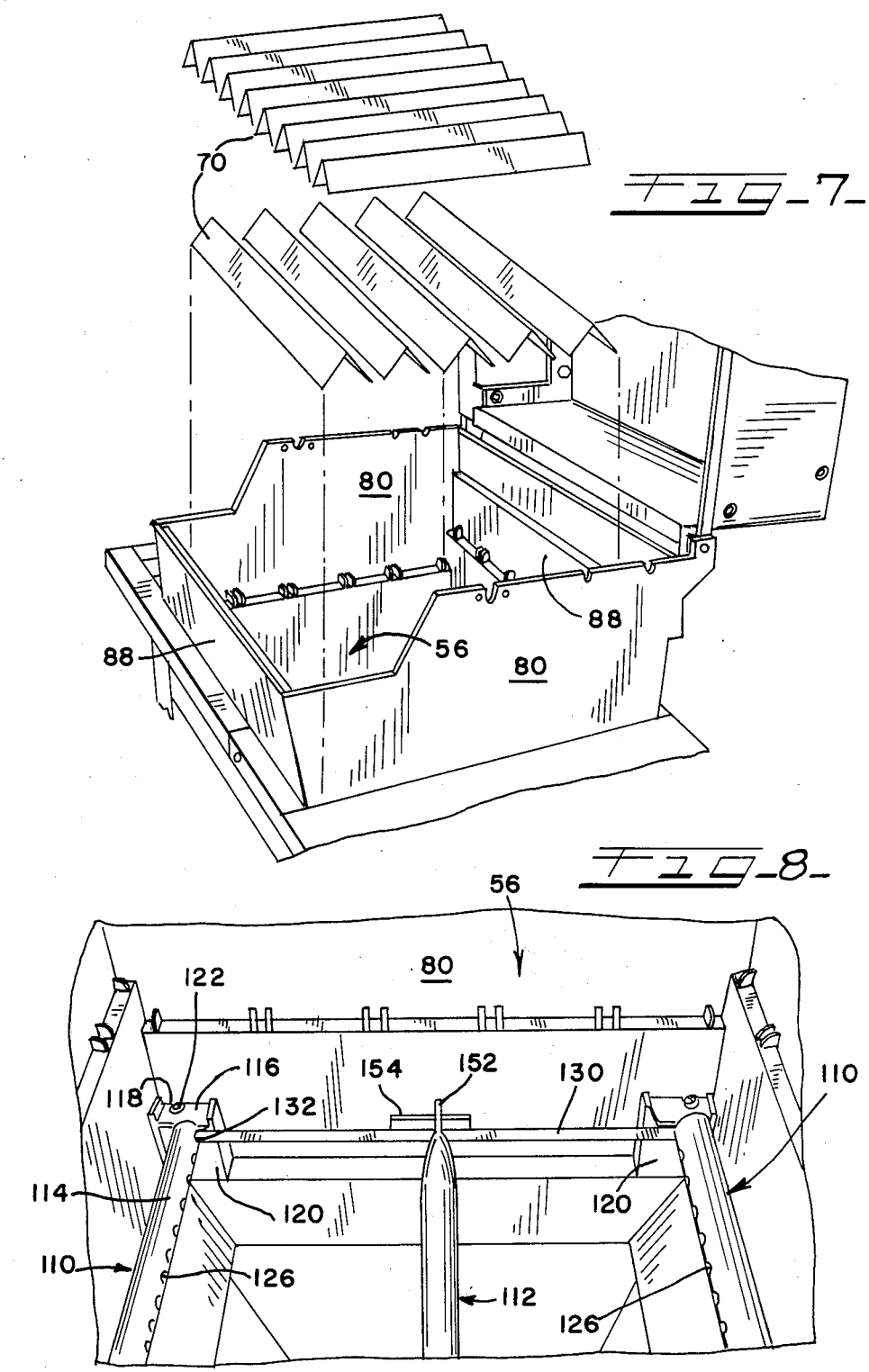

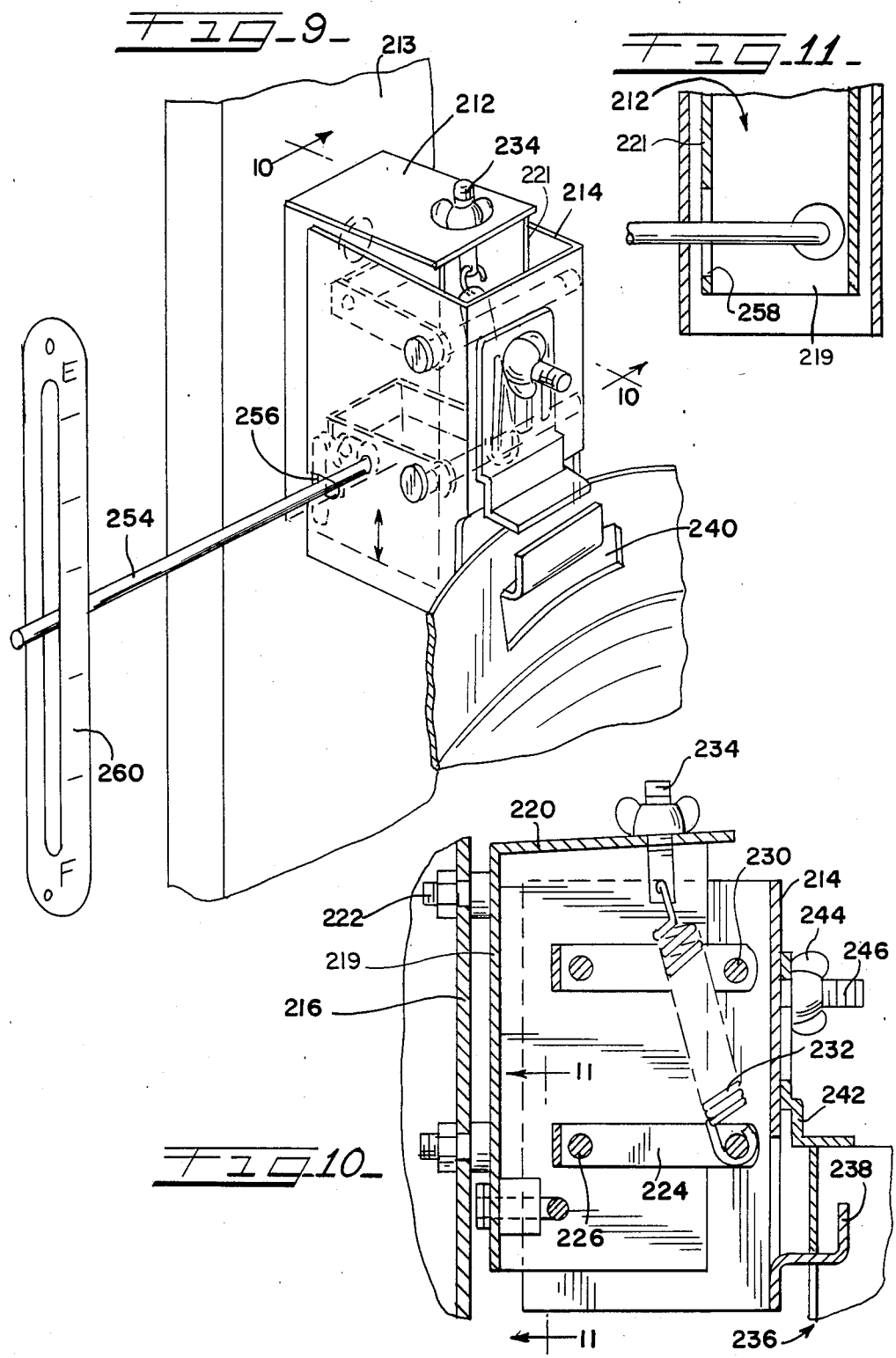

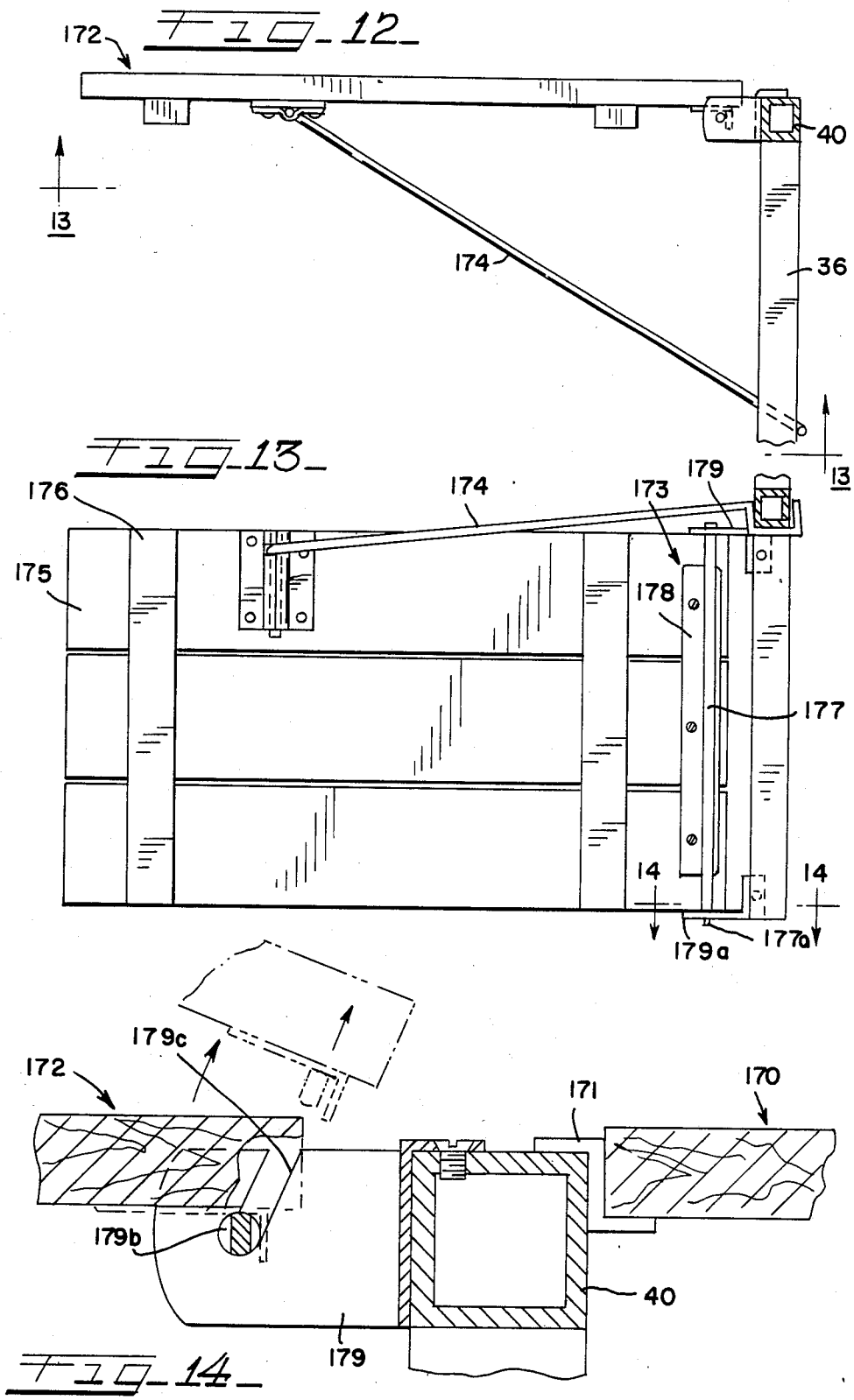

PORTABLE GAS GRILL

DESCRIPTION

1. Technical Field

The present invention relates generally to portable cooking devices and, more particularly, to portable gas grills.

2. Background Prior Art

Gas grills have become very popular as outdoor portable cooking devices.

Portable gas grills usually consist of a cart that is supported on wheels and has a cooking vessel thereon. The cooking vessel usually consists of gas burners in the lower portion of the vessel, with a grid structure above the gas burners that supports a heat-absorbing material, such as lava rock. A cooking grid is positioned above and spaced from the lava rock. A portable fuel tank is also supported on the cart and supplies fuel, such as propane, to the gas burners which supply the heat to heat the lava rock or other material.

One of the problems with this type of unit is the fact that any greases dripping from the food being cooked onto the lava rock have a tendency to ignite, producing uncontrolled flare-ups which can ruin the food being cooked. Another problem is the fact that the lava rock or other material collects the grease, which is absorbed into the material and thus becomes rather unsightly.

Various devices have been proposed for preventing the drippings of the food from impinging directly on the hot coals, but none of such devices have been accepted in the marketplace.

Another objection to the use of lava rock or other heat-absorbing material is the length of time required for heating the rock sufficiently for cooking and then subsequently the time required for cooling the lava rock.

SUMMARY OF THE INVENTION

According to the present invention, a new gas grill has been developed which eliminates the need for any lava rock or other similar materials, as well as the support grid for the lava rock. The grill is designed such that a desired amount of grease and drippings is vaporized to provide smoke for flavoring the food and those which are not vaporized are collected in an easily-removable grease collector unit that defines the bottom portion of the cooking chamber. The unit can also be operated to prevent controlled flare-ups for searing the good.

According to a primary aspect of the present invention, the gas grill incorporates sear bars that are constructed of a good heat-conductive material, which may or may not be coated with a layer of porcelain. In the preferred embodiment, the sear or flavorizing bars are generally inverted V-shaped elements that have a pair of inclined walls, and the inverted V-shaped sear bars are supported above the burner units, protecting the burner units from any drippings.

According to one aspect of the invention, the housing that defines the chamber has ledges formed in opposite end walls, with the sear bars supported on the ledges. A plurality of such sear bars make up a sear grid located above the burner units, with the ledges having positioning elements for maintaining a predetermined position between the inverted V-shaped sear bars.

In the illustrated embodiment, a second set of sears bars extend transversely to the lower sear grid. While the second sear grid is not necessary for cooking purposes, it has been found that the second sear grid, located slightly above the first sear grid, provides more uniform temperature at the cooking surface. Again, the second set of sear bars may be supported on ledges in the sidewalls of the chamber and spaced by positioning elements.

According to another aspect of the invention, the burner assembly is designed to be easily removable and can be installed without the use of any special tools. The burner assembly consists of first and second substantially identical elongated burner tubes having at least one set of spaced apertures and a flat supporting portion on one end. The flat supporting portion has a slot that is offset from the axis of the tube, which receives projections extending above support members in an adjacent pair of corners along one end wall. The tubes extend through openings in the opposite end wall so that the burner tube can be moved endwise through the opening in the end wall and have the slot receive the projection, which preferably is in the form of a threaded screw that can be tightened with a conventional screwdriver.

The burner assembly also preferably has a further aperatured connecting tube interconnecting the burner tubes adjacent the supporting end, and a third burner tube has its outer end supported on the interconnecting tube and an inner end extending through an intermediate opening in the other end wall. Thus, the burner assembly can easily be assembled without the use of any special tools, by inserting the connecting tube into openings in the two outer burner units and positioning the intermediate burner unit on the connecting tube. Preferably, the third burner tube has a positioning slot for receiving the connecting tube so that the third intermediate burner unit is properly positioned within the chamber.

The combination of a deep removable grease catcher, tubular burners and flavoring bars located a selected distance above the tubular burners, which protect the burner from drippings, substantially eliminates the possibility of the grease in the catcher pan from igniting and has been found to make the gas grill superior to what is presently available.

The firebox also has a cover connected by a hinge to an upper edge of the firebox. The cover includes two mirror-image end pieces interconnected by a porcelain-coated metal insert interconnected by special bolts that do not protrude beyond the outer surface of the end piece.

According to a further aspect of the present invention, the cooking vessel or firebox is generally rectangular and is supported on a rectangular cart that is defined by a plurality of hollow tubular members which define first and second spaced side members, and the housing is supported by the ledges in the sidewalls on the side members. The lower portion of the cooking vessel is defined by a grease collector unit that has inclined walls and a small, removable grease catcher pan at the lower end spaced a significant distance from the burners to prevent the collected grease from being ignited.

A separate burner unit may also be removably supported on one end of the spaced side members, and a work table may be supported adjacent the opposite ends of the side members. In certain instances, the separate burner unit may be eliminated and a work surface provided in the space between the side members. The work surfaces are all supported by ledges on the side members so that they can easily be removed for cleaning. If desired, a further work-supporting surface may be pivoted on one side member, with a support rod extending therefrom and supported in openings on the respective hollow tubular members so that the additional work-supporting surface may be in a lowered position, in-line with the side member or in a horizontal position and be positively supported by the rod in both positions.

According to a further aspect of the invention, the gas grill also includes a tank-supporting means consisting of a scale having a first element supported on the cart and a second element movable thereon with biasing means between the elements and tank-clamping means on the second element for suspending the tank from an upper edge thereof. The cart also includes anti-friction roller means below the elements to accommodate vertical movement of the tank as a function of the weight of the tank and an indicator movable with the second element to define the amount of fuel remaining the tank.

BRIEF DESCRIPTION OF SEVERAL VIEWS OF DRAWINGS

FIG. 1 is a perspective view of a gas grill constructed in accordance with the teachings of the present invention;

FIG. 2 is a fragmentary cross-sectional view, as viewed along line 2—2 of FIG. 1, showing the simplified interconnection between tubular members that form the cart;

FIG. 3 is a fragmentary perspective view of the firebox with the cover in a closed position;

FIG. 3A is an enlarged cross section, as viewed along line 3—3 of FIG. 3;

FIG. 4 is a cross-sectional view, as viewed along line 4—4 of FIG. 3;

FIG. 5 is an end view of the sear bar that is used to define a sear grid within the chamber;

FIG. 6 is a cross-sectional view, as viewed along line 6—6 of FIG. 4;

FIG. 7 is an exploded view of the sear grid arrangement within the chamber;

FIG. 8 is a fragmentary top perspective view showing details of the burner assembly;

FIG. 9 is a fragmentary perspective view of the scale which supports the fuel tank;

FIG. 10 is a cross-sectional, as viewed along line 10—10 of FIG. 9;

FIG. 11 is a fragmentary cross-sectional view, as viewed along line 11—11 of FIG. 10.

FIG. 12 is a side view of the pivoted working surface;

FIG. 13 is a bottom view of the view of the working surface, as viewed along line 13—13 of FIG. 12; and, FIG. 14 is a cross-sectional view, as viewed along line 14—14 of FIG. 13.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 of the drawings shows a gas grill generally designated by reference numeral 20, constructed in accordance with the teachings of the present invention.

The grill 20 consists of a portable cart 22 and a cooking vessel or chamber 24.

The cart 22 is preferably formed from a plurality of hollow rectangular tubular members 30 (FIG. 2), including a pair of rear vertical posts 32 that define legs supported on wheels 34 at the lower end thereof. The second pair of vertical posts 36 extend upwardly and define the remaining two legs. The upper portion of the cart includes a pair of spaced parallel side members 40 which are interconnected by one or more cross-members 42. According to one aspect of the invention, the side members 40 are defined by at least two end-to-end tubular members 30 that are interconnected in a unique fashion, shown in FIG. 2, without the use of any special tools or complicated fasteners.

As illustrated in FIG. 2, one tubular member 30 has a plate-like extension 44 extending from the free end and received into the adjacent open end of an adjacent tubular member 30. The extension has a width approximately equal to the space between the walls of tubular members 30 and is welded at one end 45 to one tubular member in end-to-end relation. The plate-like extension 44 has a threaded opening 46, aligned with an opening 48 in the side member, which receives a threaded fastener 50 so that the two tubular members can easily be disconnected and the cart assembly can be broken-down into smaller pieces for shipment and storage. Any number of such pieces of tubing may be utilized in assembling the cart 22 and the upper side members 40 define a generally rectangular opening for receiving the cooking vessel 24.

The cooking vessel or housing 24 consists of a lower housing or portion 52 (FIG. 4) defining a chamber 56 and having a cover 58 secured by a hinge 60 to one upper edge of one of the sidewalls that form the chamber 56. The lower chamber has a burner assembly 162 located in a lower portion thereof and a sear grid arrangement 64, located above the burner assembly 62 and a cooking grid 66.

According to the primary aspect of the present invention, the sear grid 64 is designed to replace the conventional heat-absorbing lava rock or equivalent materials and its supporting grid, and functions in a more acceptable manner than any material heretofore utilized. The sear grid 64 includes a plurality of V-shaped sear bars (FIG. 5), generally designated by reference numeral 70, and each sear bar 70 consists of a pair of inclined walls 72 that define an included angle A to produce the desired function of the sear bars. The included angle A is preferably less than 90°, and in the illustrated embodiment the angle is illustrated to be about 75°, but could be about 50° to about 80°.

The inverted V-shaped sear bar 70 is preferably formed from a metal material having good heat conducting characteristics, such as cold-rolled steel, which has a porcelain enamel coating thereon. The two inclined walls 72 define smooth outer inclined flat surfaces that will receive dripping from food, such as meats, being cooked and cause the drippings to flow along the inclined surfaces.

Because of the inverted V-shaped nature of the sear bars, and the fact that they are formed of metal which has good heat conduction, the heat from the burner assembly 62 will be trapped between the sidewalls and will quickly heat the entire sear bar to a temperature sufficient for causing a desired amount of grease received on the outer surfaces of the sidewalls 72 to vaporize and the remaining grease will pass through the sear grid 64 into a lower grease collector unit. In the preferred embodiment, the sear grid 64 is formed by five identically-constructed sear bars 70 that are supported in a predetermined position within the lower chamber 56 with small narrow spaces between adjacent bars that allow the heat to move upwardly into the upper portion of the lower chamber which supports the cooking grill or grid 66.

According to one aspect of the present invention, the sear bars are supported within the chamber such that there is no need for any fasteners, and the sear bars may be merely dropped into position. As illustrated in FIG. 6, the front and rear walls 80 of the housing each have an offset portion 82 that define upwardly-facing ledges within the chamber 56. Thus, the sear bars 70 may readily be dropped into position as shown in FIGS. 4 and 5 and the opposite ends will rest on the ledges 82. The ledges 82 have positioning elements 83 for defining a predetermined position between respective sear bars, as is shown in FIG. 4.

While not necessary for the practice of this aspect of the invention, the grill includes a second set of sear bars 70 identical to the first set, except for length, that define a second sear grid 84. Again, the sear bars 70 are supported on ledges defined by offsets 86 in the sidewalls 88 of the chamber 56. The ledges 86 again have positioning elements 83 so that the sear bars (FIG. 6) can be dropped into position without the use of any fasteners.

It has been found that the second sear grid 84, in conjunction with the first sear grid 64, will provide more uniform heat for the cooking process than was heretofore possible in utilizing lava rock or other types of heat-absorbing materials.

With the arrangement so far described, any grease or drippings off of the food being cooked will first hit the outwardly-inclined surfaces of the upper sear grid 84, which are hot and a desired amount of grease and drippings will vaporize while on the sear bars to provide the desired smoke flavoring for the food being cooked. Since each of the burner tubes of the burner assembly 62 (to be described later) is located directly below one inverted V-shaped sear bar, there is no chance of any grease being deposited directly onto the hot burners and any grease passing through the sear grids will be collected in the lower portion of chamber 56.

In this respect, the lower portion of the chamber 56 is defined by a grease collector unit 90. The grease collector unit 90 consists of a tapered tray that has an outwardly-directed lip 92 on the peripheral edge thereof and this outwardly-directed lip is supported on inwardly-directed L-shaped brackets 94 that define slide guides for removal of the tray. It should be noted that the walls of the housing extend below and outside of brackets 94 so that any water will be directed away from the inside of the tray. The collector tray or unit 90 has all of its walls tapering inwardly and downwardly, as shown in FIGS. 5 and 6, so that all of the grease drippings will be directed to a central opening 96 in the center of the lowermost portion of the tray 90.

It should be noted that the lower housing 52 defining chamber 56 is formed as a one-piece casting to eliminate any seams on the inner surface. The housing has an inwardly-directed lip 95 that defines a continuous uninterrupted surface which overlaps the peripheral edge of the grease collector unit 90 to insure that no grease escapes from the housing. It should be noted that the bracket 94 is located below the inwardly-directed lip 95, which is an integral part of the cast housing 52.

A further smaller rectangular tray or collector 98 is located below the opening 96 and again is removably supported on a wire assembly 97. Thus, grease collected by the collector unit 90 will flow into the lower centermost opening 96 and into the small removable tray or cup 98, which can easily be removed and the grease discarded. Alternatively, if a large accumulation of grease should be caught on the tapered walls of the large collector unit 90, the entire unit can be removed and easily be cleaned and reinserted. The small removable tray collects most of the grease received into the collector and is spaced substantially below the burner units to eliminate any possibility of ignition.

The collector unit 90 may also be used as a broiler by providing a grill, such as a part of the two-piece grill 66.

According to one aspect of the invention, the lower housing 52 is supported on the cart 22 and is suspended on the side members 40. As shown in FIG. 4, the offsets 86 in the sidewalls 88 that form the ledges are positioned such that these ledges will rest on top of the side members 40 to support the entire cooking vessel within the rectangular opening defined by the side members 40. If desired, a single fastener 89 may be utilized for securing the entire cooking vessel to the cart, and this fastener is shown in FIG. 6 extending through the one end wall 80 and the cross member 82 and receives a nut 89a.

According to one further aspect of the invention, the burner assembly 62 is again structurally engineered such that the entire assembly can be assembled by a purchaser without the use of any special tools and in a simplified manner. Thus, as illustrated in FIGS. 4 and 8, the burner assembly 62 consists of a pair of outer burner units 110 and an intermediate burner unit 112. The outer burner units 110 are identical in construction and are interchangeable with each other. The outer burner units each consist of an elongated, preferably circular, tube 114 that has a flattened connecting portion 116 at the outer free end thereof. The flat connecting portion 116 has a generally U-shaped slot 118 extending from the free edge thereof and, as shown in FIG. 8, the slot is offset from the axis of the tube 114, for a purpose that will be described later. The lower housing 52 has a pair of corner support members 120 positioned in the corners adjacent the one end wall 80, and these corner support members 120 define an upwardly-directed supporting surface that has an upwardly-extending abutment or projection 122. The abutment or projection is preferably in the form of a threaded fastener or screw that has an enlarged head. The projection could also be formed integrally with the support member 120.

Thus, the burner unit 110 can easily be assembled into the chamber merely by insertion of the end of the tube through an opening 124 in the opposite end wall (see FIG. 3) and the flattened portion 116 can be slid along the upper surface of the corner support member 120, with the threaded fastener 122 received into the slot 118. The burner unit 110 can then be secured by the fastener 122 at one end, while the opposite end rests on the edge of the opening 124 defined in the other end wall 80. Since the projection and slot are offset from the axis of the tube 114, there is no possibility of improper assembly of the two outer burner units 110. These burner units 110 have a row of small apertures 126 that are positioned to be directed inwardly in the assembled condition, as shown in FIG. 8, and are in a common plane with flatteded portion 116 so that any gas will be directed to the center of the lower chamber.

A third burner unit 112 is preferably located intermediate the first and second burner units and again is easily assembled without the use of any tools. For this purpose, an open-ended connecting tube or pilot tube 130 extends between the two burner units 110 and has opposite ends received into openings 132 located in the tubes 114. The opposite ends of the connecting or pilot tube 130, which is substantially smaller in diameter than the tubes 114, has a plurality of apertures (not shown) so that any gas received into the first burner unit, which is then ignited, will travel through the pilot tube 130 towards the second burner unit 110.

Thus, the first burner unit may be ignited by an electric ignitor 134 (FIG. 3), controlled by a switch 136 that is located on the control panel 138 for all of the burner units. The inner ends of the burner units 110 each having a control valve 140 located between a gas source tube 142 and the end of the burner tube 114. A control knob 144 extends from the control valve and is located above the control panel.

The third burner unit is of slightly different construction and is positioned approximately equidistant between the outer burner units 110. The third burner unit 112 again consists of a generally circular tube 150 that has a flattened portion 152 on the outer free end thereof. The flattened portion 152 has a slot 153 (FIG. 6) for receiving the tube 130 and a small projection or plate 154 welded to the surface of the tube 130 so that the inner burner unit is accurately positioned with respect to the remainder of the burner assembly. The center burner tube 150 extends through an intermediate opening 154 in the other end wall 80 (FIG. 3). The circular tube 150 has two sets of diametrically-opposed apertures 158 (FIG. 4). The intermediate unit 112 again has a valve 140 and control knob 144 as shown in FIG. 6.

With the construction of the burner assembly 62, as described above, all of the burner assembly 62 can be installed without the aid of any tools. In assembling the burner assembly, the center burner unit 112 is inserted through the intermediate opening 156 and tube 130 is moved through the slot 153 in the end of the flattened end portion 152. One end of the tube 130 is then inserted into the opening 132 in one of the burner units 110 after it has been inserted through an opening 124 and the opposite end is then moved into the opening 132 of the second unit 110. Thus, the inner free ends of the burner units are interconnected by the single connecting tube 130 which defines the support for the inner end of the intermediate burner 112. The two outer burner units are then manipulated such that the slots 118 receive the projections 122 and the three burner units are then in the position illustrated in FIG. 8 and can be held in such position by tightening the projections 122. In the assembled condition, the inner end of the burner tubes rest on the lower edges of the respective openings.

The burner assembly 62 can be ignited in sequential order, first by igniting the front burner unit 110 with the ignitor 134 by depressing of the switch 136 on control panel 138. A hole may be provided in the lower chamber for manual ignition, if desired. After the first burner unit is ignited, the second outer burner unit 110 merely needs to have gas supplied thereto and the cross-pilot tube 130 will provide the ignition for the gas in the second burner unit. Likewise, the supply of gas to the intermediate burner unit will automatically be ignited by the flames from the apertured cross-tube 130.

While the burner units have been shown as linear tubes, other configurations could be used so long as the sear bars have the same configuration as the elongated burner tubes. For example, the burner tubes could be U-shaped in plan view.

According to one further aspect of the invention, the gas grill 20 of the present invention incorporates a separate burner unit 160 which is supported on the side members 40 of the cart 22 adjacent one end thereof. The separate burner unit 160 consists of a gas burner 162 that may normally be closed by a cover 164 hinged along one edge to the burner assembly. The separate burner assembly 160 rests on and is suspended between the side members 40 and can easily be moved to a different location if desired. Alternatively, the second burner unit 160 may be eliminated and a work surface may be provided.

The working surface could be of the type shown in FIG. 1 as being a working board 170 that is supported on the side members 40 by brackets 171 (FIG. 14) adjacent the cooking vessel 24. A further working board 172 may also be provided which is movable between stored and usable positions respectively shown in FIGS. 3 and 1.

The working board 172 (FIG. 12) is preferably connected along one edge by a hinge 173 to the side member 40 and is supported in the usable position, extending generally horizontally as shown in FIG. 1, by a support rod 174. A support rod 174 is pivotally supported on the lower surface of the board 172 and has an offset outer free end received around the leg 36. The same offset portion may be received in the other leg 36 so that the working board 172 remains in a fixed stored position when not in use.

The working board may be formed from a plurality of slats 175 connected by cross-members 176. The hinge 173 includes a rod 177 connected by a bracket 178 to the working board 170. The rod has a flattened portion 177a on one end and is supported on a pair of brackets 179 and 179a. The brackets have openings 179b and one opening has a slot 179c extending to one edge for receiving the flattened portion. Thus, the working board can easily be removed for cleaning.

According to a further aspect of this invention, the grill 20 incorporates a removable thermometer 180 in the cover 58, which can be utilized for sensing the internal temperature of the cooking chamber or, alternatively, the internal temperature of the food or meat that is being cooked. Thus, thermometer 180 includes a conventional piercing portion 182 extending from an indicator dial 184. In normal operation, the portion 182 is received through an opening (not shown) in the front portion of cover 58 to be readily visible for viewing by the operator. When it is desired to sense the temperature of meat that is being cooked on the grill, the thermometer is merely removed and inserted into the food product, where the temperature is then sensed as a function of the meat temperature rather than the chamber temperature.

According to a further aspect of the invention, the cover 56 consists of two cast end caps 190 and an insert 192 formed of non-metallic material, which are interconnected through the use of special flush-headed bolts 194. The end caps 190 have extensions 195 with a handle 196 secured to the extensions.

As illustrated in FIG. 3A, the bolt 194 has an enlarged head 197 received with an enlarged recess 198 surrounding an opening 199 in end piece 190. The bolt 194 has a serrated portion 200 that provides a friction grip in the opening 199. The bolt 194 also has a threaded portion 202 received through an opening in the insert 192 and receives a nut 204. Thus, the bolt 194 can be inserted into the opening 199 and nut 204 can be used to draw the serrated portion 200 into the opening. The serrated portion 200 will prevent the bolt 194 from turning in the opening. After the nut has been tightened, the recessed head 197 will not protrude beyond the outer surface of the end piece 190, as shown in FIG. 3A.

As shown in FIG. 4, the porcelain-coated metal insert 192 has an extension 192a which extends between the handle 196 and sidewall 88 of housing 52. The extension acts as a heat shield to prevent the handle from overheating.

According to a further aspect of the invention, the gas grill also incorporates a novel tank-support means for a fuel tank 210, shown in FIG. 1. The details of the tank-support means are shown in FIGS. 9–11. The tank support means is located on one end of the cart 22 between the first pair of legs 32 so that the tank is supported directly above the wheels 34. The tank-support means consists of a first element 212 supported on a vertical member 213 that is located between the two legs 32 and a second element 214 which is movable relative to the first element or member 212. The first element 212 consists of a U-shaped bracket including a base 219 and side walls 221 enclosed by a top wall 220. The base 219 is connected by bolts 222 to the brace 213.

The second element 214 is pivotally supported on the first element by a pair of U-shaped members 224 each have one end pivoted on a pin 226 and each pin extends between the side walls 221 of U-shaped bracket. The opposite ends of the support members or bars 224 are pivotally supported on pins 230, which are carried by the second element 214. A biasing spring 232 has one end connected to one of the pins or rods 230 and the opposite end is connected to a threaded coupling 234 carried by the top wall 221 of the first element 212.

The second element 214 also has a tank-support member 236 in the form of a hook 238 that is deformed from the element 214 and extends outwardly. The hook is adapted to be received into a slot 240 formed along the upper edge of the rim of the tank. A slidable clamp element 242 is held onto the element 214 by a wing nut 244 received on a threaded element 246 carried by the second element 214. Thus, the tank can be inserted over the hook and rest on the hook and the clamp can then be used to secure the tank to the movable second element for movement therewith. The support means also consists of a pair of anti-friction means or rollers 250 that are rotatably supported on opposite sides of the vertical brace 213, as is shown in FIG. 1 of the drawings.

The tank support means also incorporates an indicator arm 254 which has an inner end pivotally supported on the first element 212 and extends through a horizontal slot 256 defined in the second element 214. More specifically, as shown in FIG. 11, the inner end of arm 254 is connected to the base 219 of the U-shaped bracket and the arm extends through a vertical slot 258 in one side wall 221. The outer end of the arm or indicator means has a scale 260 associated therewith and the position of the arm 254 with respect to the indicator 260 indicates the amount of fuel remaining within the tank. Thus, the tank moves the second element 214 to pivot the arm 254 while the horizontal slot acts as a fulcrum. By proper selection of the spring characteristics of the spring 232, a standard-sized portable tank 210 will give a fairly accurate indication of the amount of fuel within the tank on the guage 260.

Thus, the tank is supported in cantilevered fashion along the vertical brace 213 and rests or is forced up against the anti-friction means, which allows for better movement and control of the position of the tank through its weight, which is determined by the amount of fuel in the tank.

The spring characteristics are preferably such that the indicator arm remains in the "full" position until about ⅔ of the gas within the tank has been depleted. Thus, a more accurate indication of when the tank approaches complete depletion may be realized.

The cart 22 (FIG. 1) may also include cross braces 270 and a reinforcing center brace 272 on which removable article-supporting units 274 may be suspended.

As can be appreciated from the above description, the gas grill disclosed herein operates on an entirely new principal. The combination of tubular burners covered by inverted V-shaped sear bars and a deep removable grease collector unit with a small removable grease catcher pan at the lower end substantially eliminates the possibility of the grease in the collector unit from igniting. Furthermore, the sear bars can be quickly heated to a temperature sufficient for controlled flare-ups of the grease on the inclined surfaces to sear the meat being cooked. This is accomplished by ignition of all three tubular burners. After the meat, such as steaks, has been seared on both sides, the intermediate burner can be shut off and the sear bars' temperature will be reduced to a point where the grease thereon will not ignite, but will still vaporize to give the desired cooking flavor.

There is also a critical relationship between the spacing of the sear bars above the burner tubes. If the spacing is too great, the flavorizing bars will not be heated sufficient, and if the spacing is too small they will overheat. While the parameters of this spacing have not been fully explored, a spacing of about two inches between the lower edges of the flavorizing bars and the openings 126, 158 is provided for optimum heating of the bars. Also, the spacing between the lower edges of the sear bars is about 2 3/16 inches, which is significantly greater than the diameter of the burner tubes to insure that the burner tube is adequately protected.

The gas grill is designed for easy assembly without the use of any tools, and the arrangement of parts is such that minimum instructions are necessary.

While the invention has been particularly shown and described with reference to a preferred embodiment thereof, it will be understood by those skilled in the art that various changes in form and details may be made therein without departing from the spirit and scope of the invention.

We claim:

1. A gas grill comprising a rectangular housing having upper and lower edges and a pair of corner support members at opposed corners with abutments on upper surfaces between said upper and lower edges and openings in an opposed end wall aligned with said corner support members, at least two elongated burner units of substantially identical construction, each burner unit consisting of an elongated tube having at least one row of apertures along a peripheral edge and a flattened portion on one end located in a common plane with said row of apertures, said flattened portion having a slot extending from a free edge with said slot being offset from the center axis of said elongated tube and receiving an abutment so that said tubes can be inserted axially through said openings and be supported on said corner support members and said opposed wall end with said apertures directed towards the center of said housing.

2. A gas grill as defined in claim 1, further including a third burner unit intermediate said two burner units and a pilot tube interconnecting said two burner units adjacent said flattened portions, said third burner unit having a free end supported on said pilot tube and in communication therewith so that one of said burners may be ignited and the remaining burner units are ignited from said pilot tube.

3. A gas grill as defined in claim 2, in which said pilot tube is open at opposite ends and said two burner units have openings receiving said opposite ends, said pilot tube having a projection intermediate opposite ends and said third burner unit having a positioning slot receiving said pilot tube and said projection so that said pilot tube and burner units can be assembled within said housing by manipulation of said tubes without the use of any fastener means.

4. A gas grill as defined in claim 1, further including a plurality of sear bars in said housing above said burner units, each sear bar consisting of an elongated inverted V-shaped member formed of heat-conductive material to define inclined grease-evaporating surfaces extending generally parallel to said burner units.

5. A gas grill as defined in claim 4, in which said rectangular housing has opposed ledges on opposite end walls for supporting said sear bars which define a sear grid above said burner units.

6. A gas grill as defined in claim 5, further including a second group of sear bars of generally inverted V-shaped members extending generally perpendicular above said sear grid.

7. A gas grill as defined in claim 6, in which said housing has ledges on opposed sidewalls above said ledges on said end walls to support said second group of sear bars.

8. A gas grill as defined in claim 7, further including a cart supporting said housing, said cart including elongated spaced side members with said ledges on said sidewalls of said housing resting on said side members to support said housing on said cart.

9. A gas grill as defined in claim 8, in which said cart is formed from rectangular tubular members with said side members each including first and second members positioned in end-to-end relation, one of said first and second members having an internal extension received into an open end of the other of said first and second members and fastener means received by said internal extension to interconnect said first and second members.

10. A gas grill as defined in claim 7, further including a separate removable burner unit supported on said side members outside said housing.

11. A gas grill as defined in claim 1, in which said housing includes a cover hinged to an upper edge of one wall, said cover having a removable thermometer supported thereon, said thermometer including a piercing projection portion extending through said cover to sense the internal temperature of said housing, said thermometer being removable from said cover and insertable into food being cooked to sense the internal temperature of the food.

12. A gas grill as defined in claim 1, in which said housing has a removable lower grease collector unit, said grease collector unit including inwardly-tapered walls terminating adjacent a lower opening and further including a removable grease collector cup below said lower opening.

13. A gas grill as defined in claim 12, in which said housing is a one-piece casting having inwardly-tapered walls and an integral inwardly-directed lip above a lower edge and overlapping a peripheral edge of said grease collector unit, said one-piece casting providing a continuous surface for directing grease into said collector unit.

14. A gas grill as defined in claim 13, in which said burner units are linear tubes, and further including at least two inverted V-shaped sear bars spaced above and aligned with said linear tubes to cover said tubes and prevent grease from impinging thereon.

15. A gas grill as defined in claim 14, in which said linear tubes have rows of apertures and lower edges of said sear bars are spaced about two inches above said rows of apertures.

16. A portable gas grill comprising a cart of generally rectangular configuration and consisting of a plurality of tubular members arranged to define an upper rectangular opening, a one-piece cast housing having first and second opposed pairs of walls and having opposed outwardly-directed ledges integral with a pair of opposed walls and defining a chamber having a cover, said chamber having a plurality of tubular burner units, a plurality of sear bars covering said tubular burner units and adapted to receive and vaporize grease drippings thereon and prevent uncontrolled flare-ups, and a removable grease collector unit defining the interior bottom wall for said chamber.

17. A portable gas grill as defined in claim 16, in which said chamber has a lower edge located outside a peripheral rim of said collector unit, said one-piece casting having an integral inwardly-directed lip overlapping said peripheral rim to direct grease into said collector unit.

18. A portable gas grill as defined in claim 16, in which said cover includes two end pieces and a center insert with fastener means connecting said center insert to respective end pieces.

19. A portable gas grill as defined in claim 16, in which said grease collector unit includes inwardly-tapered walls leading to a lower opening, and further including a removable grease collector tray below said opening.

20. A portable gas grill as defined in claim 18, in which said fastener means includes a bolt having an enlarged head with each end piece having an enlarged recess surrounding an opening and in which said bolt has gripping means received into said opening and preventing turning of said bolt in said opening with a nut received on said bolt and rotatable to draw said gripping means into said opening.

21. In a gas grill including a cart having a fuel tank supported thereon and an indicating device for indicating the amount of fuel in the tank, said indicating device including a first element fixed to said cart and a second element movable relative to said first element with biasing means between said elements, said second element having tank support means for suspending said tank from an upper end thereof, anti-friction means on said cart below said elements engageable by said tank to accommodate vertical movement of said tank on said cart and an indicator arm pivoted on said first element and having an intermediate portion supported on said second element and positioned as a function of the weight of said tank to indicate the amount of fuel in said tank.

22. A gas grill as defined in claim 21, in which said tank support means includes a hook received into a slot on the upper end of said tank and clamp means for clamping said tank on said hook.

23. A gas grill comprising a generally rectangular cart defined by a plurality of tubular members and defining a rectangular opening; a cast rectangular housing defining a chamber, with said housing having ledges in opposed walls supported on said tubular members to support said housing in said rectangular opening, said housing having a cooking grid supported adjacent an upper edge; a gas burner assembly supported in said housing and including first and second elongated burner tubes, each having a flattened end portion with a slot extending from a free end and said housing having a pair of ledges at opposed corners with abutments on upper surfaces received into said slots so that said burner tubes can be assembled in a housing by manipulation of said tubes; and a plurality of inverted V-shaped elongated sear bars in said chamber extending generally parallel to said burner tubes to define a sear grid between said cooking grid and said burner tubes so that grease drippings from said cooking grid are vaporized on said sear bars and uncontrolled flare-ups are prevented.

24. A gas grill as defined in claim 23, further including a second set of sear bars extending transversely of said sear grid.

25. A gas grill as defined in claim 23, further including a removable grease collector unit slidably supported adjacent a lower edge of said housing and defining a bottom wall thereof.

26. A gas grill as defined in claim 24, in which said housing includes opposed side walls and opposed end walls, with said opposed side walls having said ledges formed therein and said second set of sear bars supported on said ledges and in which said opposed end walls have ledges formed therein with said sear grid supported thereon.

27. A gas grill as defined in claim 23, in which said housing has a cover hinged to one upper edge of said housing, said cover including two end pieces and an insert connected thereto, said end pieces having extensions with a handle secured to said extensions, said insert having an extension extending between said handle and said housing to define a heat shield for said handle.

28. A gas grill as defined in claim 23, further including an apertured connecting tube interconnecting said burner tubes and a third elongated burner tube supported at one end of an intermediate portion of said connecting tube and extending through an intermediate opening in said other end wall.

29. A gas grill as defined in claim 23, further including tank support means consisting of a scale having a first element supported on said cart and a second element movable thereon with biasing means between said elements and tank clamping means on said second element with anti-friction means on said cart to accommodate vertical movement of said tank on said cart as a function of the weight of said tank.

30. A gas grill comprising a rectangular housing having upper and lower edges and a first pair of corner ledges at opposed corners with abutments on upper surfaces and openings in an opposed end wall aligned with said abutments, at least two elongated burner units of substantially identical construction, each burner unit consisting of an elongated tube having at least one row of apertures and a flattened portion on one end, said flattened portion having a slot extending from a free edge with said slot being offset from the center axis of said elongated tube and receiving an abutment so that said tubes can be inserted axially through said openings and be supported on said corner ledges and said opposed wall end with said apertures of both burner units directed towards the center of said housing; a plurality of sear bars in said housing above said burner units, each sear bar consisting of an elongated inverted V-shaped member formed of heat-conductive material to define inclined grease-evaporating surfaces extending generally parallel to said burner units, said rectangular housing having opposed ledges on opposite end walls for supporting said sear bars and a second group of sear bars of generally inverted V-shaped members extending generally perpendicular and above said sear grid.

* * * * *

UNITED STATES PATENT AND TRADEMARK OFFICE
CERTIFICATE OF CORRECTION

PATENT NO. : 4,677,964

DATED : July 7, 1987

INVENTOR(S) : Charles W. Lohmeyer, Erich J. Schlosser, et al.

It is certified that error appears in the above-identified patent and that said Letters Patent are hereby corrected as shown below:

On the Title Page, please delete Charles W. Lohmeyer, Barrington; Erich J. Schlosser, Lindenhurst; James E. Tucker, Batavia; James C. Stephen, Arlington Heights; Andrzej Leja, Palatine; John Beecher, III, Carpentersville, all of Ill., and substitute:

-- Charles W. Lohmeyer, Barrington; Erich J. Schlosser, Lindenhurst; James E. Tucker, Batavia; James C. Stephen, Arlington Heights, Andrzej Leja, Palatine; John Beecher, III, Carpentersville, Ronald W. Simpkins, Arlington Heights; Donald E. Pestka, Bensenville, all of Ill. --

UNITED STATES PATENT AND TRADEMARK OFFICE
CERTIFICATE OF CORRECTION

PATENT NO. : 4,677,964
DATED : July 7, 1987
INVENTOR(S) : Charles W. Lohmeyer, Erich J. Schlosser, et al.

It is certified that error appears in the above-identified patent and that said Letters Patent is hereby corrected as shown below:

Column 1, line 50, delete "good" and insert --food--.

Column 3, line 19, after "remaining" insert --in--.

Column 4, line 36, after "assembly" delete "162" and insert --62--.

Column 6, line 26, after "nut" delete "89a" and insert --84a--.

Column 7, line 29, delete "inner" and insert --intermediate--; line 32, delete "154" and insert --156--.

Signed and Sealed this

Twenty-ninth Day of March, 1988

Attest:

DONALD J. QUIGG

*Attesting Officer*   *Commissioner of Patents and Trademarks*